United States Patent [19]

Konishi et al.

[11] Patent Number: 4,844,973

[45] Date of Patent: Jul. 4, 1989

[54] DOUBLE-COATED ADHESIVE TAPE

[75] Inventors: Toshiharu Konishi; Hiroyuki Ushiro; Takaaki Moriyama, all of Osaka, Japan

[73] Assignee: Nitto Electric Industrial Co., Ltd., Osaka, Japan

[21] Appl. No.: 79,388

[22] Filed: Jul. 30, 1987

[30] Foreign Application Priority Data

Jul. 30, 1986 [JP] Japan ................ 61-117048[U]

[51] Int. Cl.⁴ .................................................. B32B 3/24
[52] U.S. Cl. ................................ 428/286; 428/311.1; 428/317.3; 428/336; 428/343; 428/354
[58] Field of Search ............ 428/343, 354, 286, 304.4, 428/311.1, 317.3, 336; 128/156

[56] References Cited

U.S. PATENT DOCUMENTS

| | | | |
|---|---|---|---|
| Re. 31,886 | 5/1985 | Hodgson | 128/156 |
| 3,434,472 | 3/1969 | Herniman et al. | 428/343 |
| 4,522,870 | 6/1985 | Esmay | 428/354 |
| 4,636,427 | 1/1987 | Ohno et al. | 428/286 |

*Primary Examiner*—Paul J. Thibodeau
*Attorney, Agent, or Firm*—Sughrue, Mion, Zinn, Macpeak & Seas

[57] ABSTRACT

A double-coated adhesive tape comprising a tape support having provided on both surfaces thereof a pressure-sensitive adhesive layer is disclosed. The tape support used is a thin non-woven fabric having specific properties. The tape has a flexibility and can be cut easily with fingers.

4 Claims, 1 Drawing Sheet

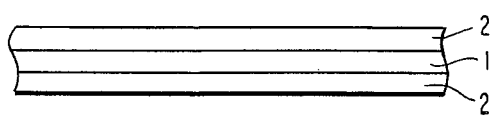

DOUBLE-COATED ADHESIVE TAPE

FIELD OF INVENTION

The present invention relates to a double-coated adhesive tape, sheet or leaf having a pressure-sensitive adhesive layer on both sides thereof (hereinafter referred to as "double-coated adhesive tape" for simplicity), and more particularly, to a double-coated adhesive tape which is free from delamination and has a uniform thickness by coating one time a pressure-sensitive adhesive solution or aqueous dispersion on a thin non-woven fabric as a tape support, whereby the pressure-sensitive layers on both sides of the thin non-woven fabric are integrally bonded.

BACKGROUND OF THE INVENTION

In general, the double-coated adhesive tape is prepared by forming a pressure-sensitive adhesive layer on both sides of a tape support such as a paper, a non-woven fabric, a film or sheet of a foamed product, a plastic film, etc. Those tape supports have fine pores or do not entirely have pores. Therefore, in order to form a pressure-sensitive layer on both sides of the support, a pressure-sensitive adhesive solution or aqueous dispersion must be coated on both sides of the tape support respectively.

The double-coated adhesive tape using a tape support having cushioning properties such as a paper, a non-woven fabric, a film or sheet of a foamed product, etc., which are conventionally used, exhibits good adhesive properties to an object to be adhered even if the surface thereof is a rough surface, due to the cushioning properties of the tape support. On the other hand, such double-coated adhesive layers provided on both sides of the tape support are separated by the tape support, in the event that the adhesive tape is rapidly unwound from a tape rolled state or an external force is applied to an object adhered with the adhesive tape, delamination tends to occur in the tape support, and also where the adhesive tape is wound into a rolled state by interposing a release paper or release film therebetween and stored, the pressure-sensitive adhesive layer partially impregnates into the tape support, and as a result, the thickness of the adhesive tape becomes ununiform or a so-called gapping occurs, thereby markedly lowering the commercial value.

On the other hand, use of a porous tape which has been subjected to a physical perforation treatment is proposed to prevent the delamination. However, since the tape support is thick and the pore intervals are long, the delamination is not effectively prevented. Further, since it is difficult for the pressure-sensitive adhesive layer to be sufficiently charged within the pores at the preparation, the pressure-sensitive adhesive layer is pressed into the pores with the passage of time and such portions become the sinked shape, markely deteriorating the commercial value.

Further, in order to prevent an ununiformity of the tape thickness due to impregnation or gapping, an attempt has been made that the tape support is not used and the adhesive function is given with only the pressure-sensitive adhesive layer. However, only the pressure-sensitive adhesive layer lacks self-supporting properties, the handling is difficult and deformation easily occurs during handling and operation.

SUMMARY OF THE INVENTION

Accordingly, an object of the present invention is to provide a novel double-coated adhesive tape which overcomes the disadvantages encountered in the prior art.

The double-coated adhesive tape according to the present invention comprises a tape support having provided on both surfaces thereof a pressure-sensitive adhesive layer, wherein the tape support is a thin non-woven fabric having the following properties:

(A) Pores substantially penetrating from one surface to other surface are present;

(B) The total area of the substantially penetrating pores is at least 20%;

(C) The average opening area of the substantially penetrating pore is at least 0.001 mm$^2$; and (D) The weight is 50 g/m$^2$ or less.

BRIEF DESCRIPTION OF THE DRAWING

The FIGURE is a cross-sectional view of the embodiment of the double-coated adhesive tape according to the present invention.

DETAILED DESCRIPTION OF THE INVENTION

The present invention is explained in detail by reference to the drawing.

In the FIGURE, 1 is a thin non-woven fabric as a tape support, and 2 is a pressure-sensitive adhesive layer formed on both sides of the non-woven fabric.

The double-coated adhesive tape according to the present invention is prepared using, as a tape support, a thin non-woven fabric having the following specific structures and weight:

(A) Pores substantially penetrating from one surface to other surface are present;

(B) The total area of the substantially penetrating pores is at least 20%;

(C) The average opening area of the substantially penetrating pore is at least 0.001 mm$^2$; and (D) The weight is 50 g/m$^2$ or less.

In the preparation of the double-coated adhesive tape, a pressure-sensitive adhesive solution or aqueous dispersion having a viscosity(at 25° C.) of about several ten to several hundred poises is used.

The double-coated adhesive tape according to the present invention is prepared by a method comprising coating the pressure-sensitive adhesive solution or aqueous dispersion on, for example, a release paper, placing the tape support on the coating layer, thereby embedding the tape support in the coating layer, and drying the assembly under heating under this state.

The double-coated adhesive tape is also prepared by a method comprising coating the pressure-sensitive adhesive solution on a release paper, laminating the tape support on the coating layer, coating the pressure-sensitive adhesive solution or aqueous dispersion on the tape support, and drying the assembly under heating under the condition that the support is impregnated with the solution or aqueous dispersion.

Therefore, the thin non-woven fabric as the tape support must be sufficiently porous to the extent that the pressure-sensitive adhesive solution or aqueous dispersion can pass through the tape support easily and quickly within a short period of time.

The porous conditions of the tape support are as follows.

(A) At least 50% of pores of the thin non-woven fabric substantially penetrate the thin now-woven fabric. The expression "substantially penetrate" means the portion that fibers are not entirely present, assuming that the non-woven fabric is a plane.

(B) The proportion of the area of the penetrating pores (i.e., the proportion of the area of the penetrating pores per unit area of the non-woven fabric) is at least 20%, preferably 30 to 90%, and most preferably 50 to 80%. If the proportion thereof is less than 20%, the pressure-sensitive adhesive solution or aqueous dispersion does not pass or is difficult to pass through the thin non-woven fabric. As a result, the integral bonding of the pressure-sensitive adhesive layers on both sides of the thin non-woven fabric is not expected, resulting in the delamination.

(C) The average opening area of the substantially penetrating pore is at least 0.001 mm$^2$, preferably 0.005 to 0.5mm$^2$, and most preferably 0.01 to 0.2 mm$^2$. If the average opening area is less than 0.001 mm$^2$, the integral bonding of the pressure-sensitive adhesive layers is not expected due to non-passing of the pressure-sensitive adhesive solution or aqueous dispersion through the non-woven fabric.

(D) The weight of the thin non-woven fabric is 50 g/m$^2$ or less, preferably 2 to 25 g/m$^2$, and most preferably 5 to 15 g/m$^2$. If the weight thereof exceeds 50 g/m$^2$, the proportion of the opening area of the pores becomes too small or the thickness of the non-woven fabric becomes too thick, and the pressure-sensitive adhesive solution or aqueous dispersion does not pass through the non-woven fabric sufficiently.

Other porous condition is a thickness of the non-woven fabric. The thickness thereof is not particularly limited, but it is preferred for the thickness to be 180 μm or less. The smaller thickness of the non-woven fabric is preferred in that the amount of the pressure-sensitive adhesive can be decreased and the foaming is difficult to occur. However, the physical strength is poor and the thickness of 5 to 80 μm is preferred from the standpoint of the practical use.

The porous thin non-woven fabric is prepared using fibers made of, for example, viscose rayon, polyester, polyolefin, etc.

The double-coated adhesive tape according to the present invention is prepared by a single coating of a pressure-sensitive adhesive solution or aqueous dispersion in the inside or both sides of a porous thin non-woven fabric in an amount such that the solids content of the adhesive solution or aqueous dispersion is about 10 to about 300 g/m$^2$, thereby forming substantially non-porous pressure-sensitive adhesive layers on both sides of the non-woven fabric.

The pressure-sensitive adhesive which can be used in the present invention is generally an acrylic pressure-sensitive adhesive or a rubber-based pressure-sensitive adhesive.

Examples of the acrylic pressure-sensitive adhesive include acrylic copolymers prepared by copolymerizing alkyl esters of (meth)acrylic acid and monomers copolymerizable therewith (e.g., (meth)acrylic acid, (meth)acrylic acid-2-hydroxyethyl ester, (meth)acrylamide, glycidyl (meth)acrylate, vinyl acetate, acrylanitrile, styrene or vinyl pyrrolidone).

Examples of the rubber-based pressure-sensitive adhesive include mixtures of rubbers (e.g., natural rubber, polyisobutylene rubber, chloroprene rubber, styrene-isoprene-styrene block copolymer) and tackifiers (e.g., resin, terpene resin or petroleum resin).

The thin non-woven fabric may be subjected to a resin treatment by coating a solution (solids content: 2–7 wt%) of a resin having a modulus of elasticity of at least $10^3$ kg/cm$^2$, preferably at least $5 \times 10^3$ kg/cm$^2$, such as polystyrene, polyacrylic ester or polyvinyl chloride, dissolved in a solvent, and drying the resulting coating.

The amount of resin treatment to the non-woven fabric (i.e., the amount of resin deposited) is determined depending upon the weight and quality of the non-woven fabric, modulus of elasticity of the resin, and the like. For example, in a rayon-based non-woven fabric or synthetic fiber-based non-woven fabric having an average pore area of 0.1 0.01 mm$^2$, a proportion of opening pores of 70–90% and a weight of 7 to 13 g/m$^2$, a polystyrene resin having a modulus of elasticity of 1 to 20 g/m$^2$ is coated thereon in an amount of 1 to 20 g/m$^2$.

This resin treatment is more effective to prevent the delamination of the double-coated adhesive tape.

The double-coated adhesive tape of the present invention having the structure as described above has the characteristics that since the adhesive layers present on both sides of the thin non-woven fabric are integrally bonded, the tape has uniform thickness, delamination does not occur, and the tape does not have gapping with the passage of time.

Further, the tape has the practical effects that the tape is flexible, can cut with fingers, and has a self-supporting property, resulting in easy handling.

While the invention has been described in detail and with reference to specific embodiments thereof, it will be apparent to one skilled in the art that various changes and modifications can be made therein without departing from the spirit and scope thereof.

What is claimed is:

1. A double-coated adhesive tape comprising a tape support having provided on both surfaces thereof a pressure-sensitive adhesive layer, wherein the tape support is a non-woven fabric having the following properties:
   (A) Pores substantially penetrating from one surface to the other surface are present;
   (B) The total area of the substantially penetrating pores is at least 20%;
   (C) The average opening area of the substantially penetrating pores is at least 0.001 mm$^2$;
   (D) The weight is 50 g/m$^2$ or less; and
   (E) The thickness is 180 μm or less.

2. The double-coated adhesive tape as in claim 1, wherein the area of the substantially penetrating pore is 30 to 90%.

3. The double-coated adhesive tape as in claim 1, wherein the average opening area of the substantially penetrating pore is 0.005 to 0.5 mm$^2$.

4. The double-coated adhesive tape as in claim 1, wherein the weight of the thin non-woven fabric is 2 to 25 g/m$^2$.

* * * * *